United States Patent
Kang et al.

(10) Patent No.: US 11,747,990 B2
(45) Date of Patent: Sep. 5, 2023

(54) METHODS AND APPARATUSES FOR MANAGEMENT OF RAID

(71) Applicant: EMC IP Holding Company LLC, Hopkinton, MA (US)

(72) Inventors: Jianbin Kang, Beijing (CN); Yousheng Liu, Beijing (CN); Xinlei Xu, Beijing (CN); Jian Gao, Beijing (CN); Ping Ge, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/516,766

(22) Filed: Nov. 2, 2021

(65) Prior Publication Data

US 2022/0326857 A1 Oct. 13, 2022

(30) Foreign Application Priority Data

Apr. 12, 2021 (CN) .......................... 202110389768.2

(51) Int. Cl.
*G06F 3/06* (2006.01)
*G06F 11/10* (2006.01)

(52) U.S. Cl.
CPC .......... *G06F 3/0617* (2013.01); *G06F 3/0632* (2013.01); *G06F 3/0689* (2013.01); *G06F 11/1084* (2013.01); *G06F 11/1092* (2013.01)

(58) Field of Classification Search
None
See application file for complete search history.

(56) References Cited

U.S. PATENT DOCUMENTS

| | | |
|---|---|---|
| 10,346,247 B1 | 7/2019 | Gao et al. |
| 10,733,042 B2 | 8/2020 | Gao et al. |
| 11,003,556 B2 | 5/2021 | Ma et al. |
| 2004/0062093 A1* | 4/2004 | Harashima ......... G11B 20/1803 |
| 2006/0117216 A1* | 6/2006 | Ikeuchi ............... G06F 11/1662 |
| | | 714/6.2 |
| 2008/0010494 A1 | 1/2008 | Takizawa |
| 2014/0164849 A1 | 6/2014 | Floeder et al. |
| 2018/0113761 A1* | 4/2018 | Ko .................... G06F 3/0619 |
| 2019/0087122 A1* | 3/2019 | Shinozuka ............ G06F 3/0619 |
| 2019/0130993 A1* | 5/2019 | Kim ...................... G11C 17/16 |
| 2019/0146890 A1* | 5/2019 | Dorfman ................. G06F 3/061 |
| | | 714/6.21 |
| 2020/0012560 A1* | 1/2020 | Cheng ..................... G11C 29/52 |

* cited by examiner

*Primary Examiner* — Stephanie Wu
(74) *Attorney, Agent, or Firm* — BainwoodHuang

(57) ABSTRACT

Techniques for managing a redundant array of independent disks (RAID) involve detecting an abnormality of a storage device in a RAID. The techniques further involve resetting the storage device in response to detecting the abnormality. The techniques further involve storing an address of a write operation for the RAID within a preset time period, so as to rebuild the RAID in the case that the storage device is recovered within the preset time period. Accordingly, temporary errors of the RAID can be efficiently handled, the number of downtime of the RAID caused by the storage device or the back end can be reduced, and computing resources and time required to rebuild the RAID can be significantly reduced.

20 Claims, 9 Drawing Sheets

METHODS AND APPARATUSES FOR MANAGEMENT OF RAID

CROSS-REFERENCE TO RELATED APPLICATION

This application claims priority to Chinese Patent Application No. CN202110389768.2, on file at the China National Intellectual Property Administration (CNIPA), having a filing date of Apr. 12, 2021, and having "METHODS AND APPARATUSES FOR MANAGEMENT OF RAID" as a title, the contents and teachings of which are herein incorporated by reference in their entirety.

TECHNICAL FIELD

The embodiments of the present disclosure relate to the field of computers, and more particularly, to a method, an apparatus, a device, a computer-readable storage medium and a computer program product for managing a redundant array of independent disks (RAID).

BACKGROUND

A redundant array of independent disks is a data storage virtualization technology that combines multiple physical storage devices (for example, hard disk drives or solid state disks) into a single logical unit for the purposes of data redundancy, performance improvement, or both. Depending on the level of redundancy and performance required, data is distributed across physical storage devices in one of several ways called a RAID level (for example, RAID 0, RAID 1, and RAID 5). In an I/O read-write operation for the RAID, the data will be divided into data blocks according to corresponding RAID levels and stored in corresponding storage devices.

In some cases, the back end (such as a certain storage device) of the RAID may enter a temporary error state (such as glitch caused by power failure, firmware upgrade, hiccup, and the like) during the I/O operation, which may return a retry error. However, the RAID may always process the error by retrying until the I/O operation times out, which eventually leads to system degradation, and even downtime or data unavailability. Therefore, it is desirable to provide an improved solution to improve or optimize the RAID performance in this situation.

SUMMARY OF THE INVENTION

According to a first aspect of the present disclosure, provided is a method for managing a redundant array of independent disks (RAID), including: detecting an abnormality of a storage device in the RAID; resetting the storage device in response to detecting the abnormality; and storing an address of a write operation for the RAID within a preset time period, so as to rebuild the RAID in the case that the storage device is recovered within the preset time period.

According to a second aspect of the present disclosure, provided is an apparatus for managing RAID, including: an abnormality detection unit, configured to detect an abnormality of a storage device in the RAID; and an abnormality processing unit, configured to reset the storage device in response to detecting the abnormality, wherein the abnormality processing unit is further configured to store an address of a write operation for the RAID within a preset time period, so as to rebuild the RAID in the case that the storage device is recovered within the preset time period.

According to a third aspect of the present disclosure, provided is an electronic device, including: at least one processing unit; and at least one memory, coupled to the at least one processing unit and storing instructions for execution by the at least one processing unit, wherein the instructions, when executed by the at least one processing unit, cause the device to perform the method according to the first aspect of the present disclosure.

According to a fourth aspect of the present disclosure, provided is a computer-readable storage medium, including machine-executable instructions, wherein the machine-executable instructions, when executed by a device, cause the device to perform the method according to the first aspect of the present disclosure.

According to a fifth aspect of the present disclosure, provided is a computer program product, including machine-executable instructions, wherein the machine-executable instructions, when executed by a device, cause the device to perform the method according to the first aspect of the present disclosure.

The Summary of the Invention section is provided to introduce the selection of concepts in a simplified form, which will be further described in the Detailed Description below. The Summary of the Invention section is neither intended to identify key features or essential features of the present disclosure, nor intended to limit the scope of the present disclosure.

BRIEF DESCRIPTION OF THE DRAWINGS

The above and other objectives, features, and advantages of the present disclosure will become more apparent by describing example embodiments of the present disclosure in more detail with reference to the accompanying drawings, and in the example embodiments of the present disclosure, the same reference numerals generally represent the same components.

DETAILED DESCRIPTION

Figure 1:
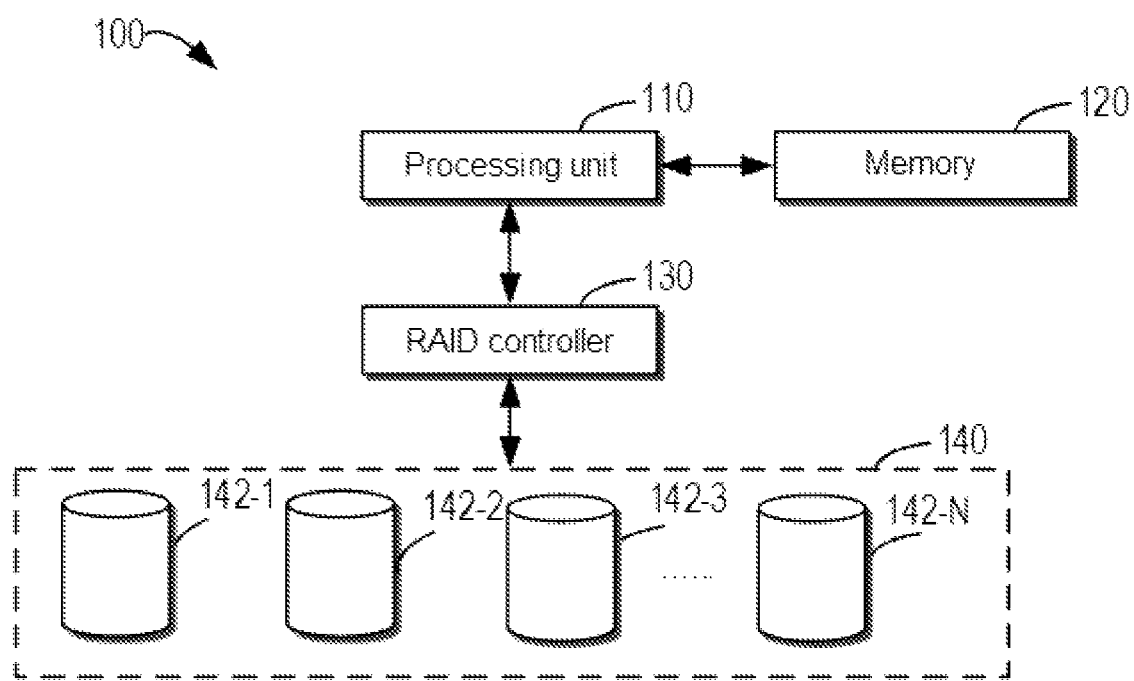
FIG. 1 shows a schematic structural diagram of a storage system according to the embodiments of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Preferred embodiments of the present disclosure will be described in more detail below with reference to the accompanying drawings. While the preferred embodiments of the present disclosure are shown in the accompanying drawings, it should be understood that the present disclosure can be implemented in various forms without being limited to the embodiments set forth herein. Rather, these embodiments are provided to make the present disclosure more thorough and complete and to fully convey the scope of the present disclosure to those skilled in the art.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" denotes "at least one additional embodiment." The terms "first," "second," and the like may refer to different or identical objects. Other explicit and implicit definitions may also be included below.

Traditionally, some temporary errors in a storage system may cause degradation or even downtime of a RAID, and a large quantity of computing resources and time is required to rebuild the RAID after the errors are eliminated. These will degrade the performance of the RAID.

The inventor noticed that this temporary error is likely to only last for a short time (a few seconds to tens of seconds), and the storage device can be recovered from the temporary error by simple resetting and brought back online. Based at least on the above knowledge, the present disclosure provides an improved storage management solution in a RAID-based storage system. According to this solution, the RAID can enter a temporary degraded state and reset a storage device when an I/O error or abnormality of the storage device occurs. In the temporary degraded state, an address of a write operation for the RAID can be stored, so that the stored address of the write operation is used to rebuild the RAID when the storage device is recovered, instead of scanning the entire RAID to determine a degraded address. As a result, the I/O error or abnormality of the RAID can be processed more efficiently, the number of downtime of the RAID caused by a device failure or the back end can be reduced, and the computing resources and time required to rebuild the RAID can be significantly reduced.

Implementation details of the present disclosure will be described in detail below with reference to FIG. 1 to FIG. 10. First, an example basic architecture and example data layouts of a RAID-based storage system are introduced.

FIG. 1 shows a schematic structural diagram of storage system 100 according to the embodiments of the present disclosure. As shown in FIG. 1, storage system 100 includes hardware storage pool 140 that includes a plurality of storage devices 142-1, 142-2, 142-3, . . . , 142-N (N is an integer greater than 1), etc. to provide a physical storage space of storage system 100. For ease of discussion, these storage devices are sometimes referred to collectively or respectively as storage device 142 or storage disk 142 (that can be used interchangeably in the present disclosure). Storage device 142 may include various types of devices having a storage function, including but not limited to a hard disk drive (HDD), a solid state disk (SSD), a removable disk, a compact disk (CD), a laser disk, an optical disk, a digital versatile disk (DVD), a floppy disk, a Blu-ray disk, a serial-attached small computer system interface (SCSI) storage disk (SAS), a serial advanced technology attachment (SATA) storage disk, any other magnetic storage devices and any other optical storage devices, or any combination thereof.

RAID controller 130 in storage system 100 is established over a plurality of storage devices 142 to organize physical storage spaces of storage devices 142 by using a RAID algorithm. RAID controller 130 can have a mapping function used to manage mapping between a physical address and a logical address of storage system 100. RAID controller 130 provides a flat linear logical address space to upper processing unit 110.

Processing unit 110 uses the logical address space provided by RAID controller 130 to perform an I/O operation on storage system 100. Specifically, processing unit 110 can send an I/O request including a logical address to RAID controller 130, and RAID controller 130 searches a physical address (an address where data is written to or an address where data is read from) of data directed to by the I/O request by means of the mapping function, and performs an actual I/O operation to storage disk 142 at the back end.

Storage system 100 further includes memory 120 (which may also be referred to as an internal memory or a main memory). Memory 120 is used to store data accessed by processing unit 110 with a relatively small delay. The data in memory 120 may generally be volatile, which is erased when storage system 100 is powered off.

It should be understood that FIG. 1 only schematically illustrates units, modules, or components in storage system 100 that are related to the embodiments of the present disclosure. Various components shown in FIG. 1 are merely an example storage system management architecture, and in other RAID-based storage systems, there may be other architecture division manners, other units, modules, or components for other functions, and the like. Therefore, embodiments of the present disclosure are not limited to the specific devices, units, modules, or components depicted in FIG. 1, but are generally applicable to any storage system based on RAID technologies. The various components shown in FIG. 1 (except hard storage disk 142) may be implemented in a single or multiple computing devices.

Figure 2:
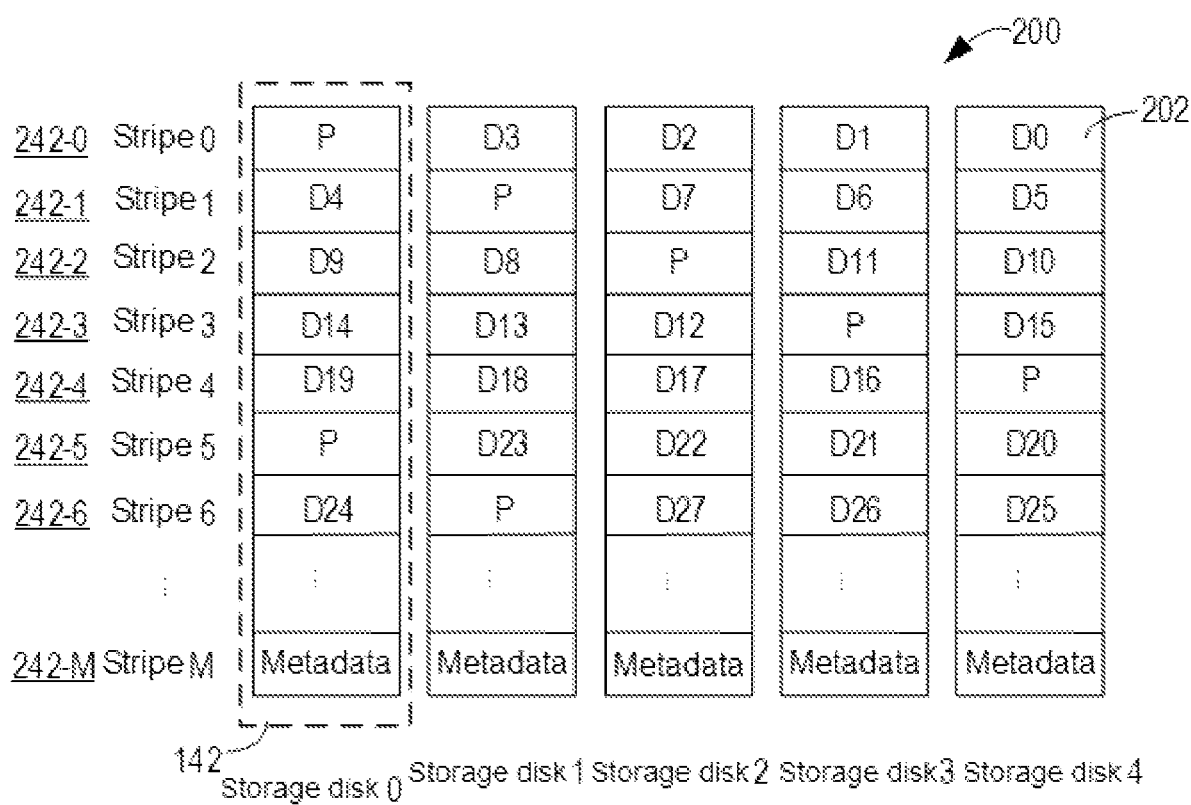
FIG. 2 shows a schematic diagram of an example layout of a RAID according to the embodiments of the present disclosure.

The way of storing data in the RAID is described below with reference to FIG. 2. In FIG. 2 and the followings, for the purpose of explanation, the RAID 5 type is adopted to discuss the example embodiments of the present disclosure. However, it should be understood that the example embodiments of the present disclosure may be similarly applied to any other types of RAIDs.

FIG. 2 is a schematic diagram of example layout 200 of a RAID according to the embodiments of the present disclosure. In FIG. 2, each storage disk 142 is divided into several storage blocks 202 according to a preset size, and several stripes 242-0, 242-1, 242-2, 242-3, 242-3, 242-3, 242-4, 242-5, 242-6, . . . , 242-M (collectively referred to as strip 242) are formed across a corresponding plurality of data blocks of a plurality of storage disks. Therefore, a physical storage space of the RAID is divided into a plurality of stripes. The stripes may also be referred to as a physical large block (PLB). For example, each stripe can have the same size, such as 2 MB.

A plurality of storage blocks 202 of each stripe 242 are respectively allocated to store data and check information calculated through a certain encoding algorithm. The data of one or more storage blocks in stripe 242 may be calculated from the data of other storage blocks in the strip. In FIG. 2, storage blocks allocated to store data in each stripe 242 are marked with "D" (the storage blocks storing data in the stripe are also numbered accordingly), and storage blocks allocated to store check information are marked with "P." The number of storage blocks storing data and the number of storage blocks storing check information in each stripe 242 depend on the type of the RAID. In RAID 5-based stripe 242 shown in FIG. 2, four storage blocks 202 are used to store data, and the other storage block 202 is used to store check information. In this case, for a RAID with a stripe size of 2 MB, the size of each storage block is 512 KB.

By use of the check information, a RAID-based storage system allows, in the event of a failure of one or some storage disks, to use storage blocks of other storage disks to recover the content on each failed storage disk. For example, if storage disk 0 fails and the storage blocks on it become inaccessible, storage disks 1 to 4 can be used to recover the contents in the storage blocks on it. Specifically, for stripe 242-0, P can be calculated by storage blocks D3, D2, D1, and D0; and for stripe 242-1, D4 can be calculated by storage blocks P, D7, D6, and D5, and so on.

In some embodiments, the position of storage block 202 used to store the check information in different stripes 242 can rotate cyclically between different storage disks 142. For example, in FIG. 2, storage block 202 used to store the check information in stripe 242-0 is located on storage disk 0, storage block 202 used to store the check information in stripe 242-1 is located on another storage disk 1, storage block 202 used to store the check information in stripe 242-2 is located in different storage disk 2, and so on. As data is written, the storage blocks in stripe 242 are used to store the data and corresponding check information in a similar layout manner.

It should be understood that FIG. 2 is only a stripe layout based on the RAID 5 type. Stripes of other types of RAID may have other layouts. In some embodiments, in a RAID established based on other RAID types, each stripe may also have two or more storage blocks used to store check information. For example, in a RAID 6-based RAID, each stripe includes six storage blocks, four of which are used to store data and two of which are used to store check information.

During the operation of storage system 100, all storage blocks 202 of storage disk 142 are marked as failed if certain storage disk 142 becomes offline due to, for example, glitch, failure, or being unplugged, and storage system 100 will enter a degraded state. In this state, due to the existence of a failed storage disk, an I/O access (read and write) of each stripe 242 will be affected. When storage system 100 is in the degraded state, the I/O read and write operations can still be performed on storage system 100, but it is necessary to avoid access to the failed storage disk. For the read operation, the storage blocks of other good storage disks need to be used to recover data to be read if the storage block of the failed disk is data block (D); and for the write operation, the write operation will be marked as a degraded write operation, and a corresponding address is also marked as degraded. The RAID will be rebuilt for the address of the degraded write operation after the failure of storage system 100 is eliminated.

To this end, as shown in FIG. 2, each storage disk 142 further includes storage blocks used to store metadata, and these storage blocks form stripe 242-M across multiple storage disks. The storage blocks storing metadata may be located in designated areas of all storage disks 142 and protected from being used to store user data (for example, as shown in stripe 0 to stripe 6). Metadata can record the state information of the storage device in the RAID and information of stripe states, such as an identifier of the storage device that is faulty or abnormal, the states of the stripes (normal or degraded), and an identifier of a storage device where the check data of a stripe is located.

Figure 3:
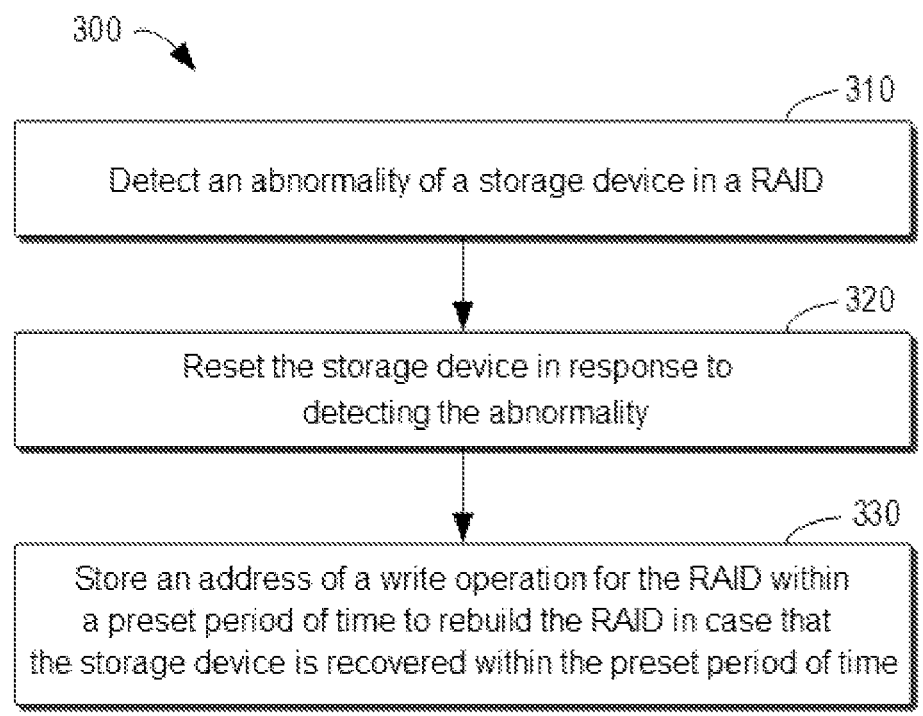
FIG. 3 shows a schematic flowchart of a method for managing a RAID according to the embodiments of the present disclosure.

FIG. 3 shows a schematic flowchart of method 300 for managing a RAID according to the embodiments of the present disclosure. In some embodiments, method 300 may be implemented at storage system 100, particularly at RAID controller 130. Therefore, method 300 is implemented, for example, by a computing device that implements storage system 100 or RAID controller 130.

At block 310, an abnormality of a storage device in the RAID is detected. Generally, the RAID may enter a degraded state in response to detecting the abnormality. The RAID enters the degraded state when a traditional storage system receives a failure event (such as a timeout) from the storage device. However, the storage system may have been in reduced performance for a long time and has not been dealt with. In some embodiments, it is considered that there is an abnormality when the storage device (a certain storage disk) at the back end continues to return a retryable error. For example, when an I/O operation (read or write operation) for a certain storage device generates retryable errors that exceed a threshold number, for example, when the I/O operation generates the retryable errors for 3, 5, or more times, it is determined that the abnormality of the storage device is detected. To this end, a counter used to record the retryable errors can be set for the I/O operation in the RAID. The abnormality is reported when the numerical value of the counter exceeds the threshold set. Therefore, it is not necessary to wait until a timeout error occurs, and the abnormality processing process can be carried out as soon as possible.

In some embodiments, it is determined that the storage device is abnormal in response to receiving a timeout error of the I/O operation generated by a back-end storage device. It should be understood that the timeout error explicitly indicates the abnormality of the storage device.

In some embodiments, it is determined that the storage device is abnormal when the RAID detects that the I/O operation on the storage device slows down. The completion time of I/O operations for the back-end storage device in the most recent period of time (for example, 1 minute, 5 minutes, 10 minutes, and half an hour) can be collected, and the average completion time can be calculated. For example, it is determined that there is an abnormality if the average completion time of the read operation is greater than preset threshold time; or it is determined that there is an abnormality if the average completion time of the write operation is greater than another preset threshold time. For another example, the average completion time of the read operations or write operations of all the storage devices within the most recent period of time can be calculated and compared with each other; and it is determined that a storage device is abnormal when the average completion time of the I/O operation of the storage device is significantly shorter than that of other storage devices. For another example, the average completion time of the read operation or write operation of a single storage device within the most recent period of time can be calculated and compared with historical average completion time of the storage device; and it is determined that the storage device is abnormal when the average completion time is significantly longer than the historical average completion time.

As shown in FIG. 3, at block 320, the storage device is reset in response to detecting the abnormality. According to the embodiments of the present disclosure, the storage device is possibly recovered from the error or abnormality after it is reset, and comes back online. Therefore, the RAID can be recovered from a temporary error faster without waiting for the occurrence of a timeout error. The abnormality processing process according to the embodiments of the present disclosure will be described in detail below with reference to FIG. 4 to FIG. 8. First, a state transition of the RAID due to the abnormality is described.

Figure 4:
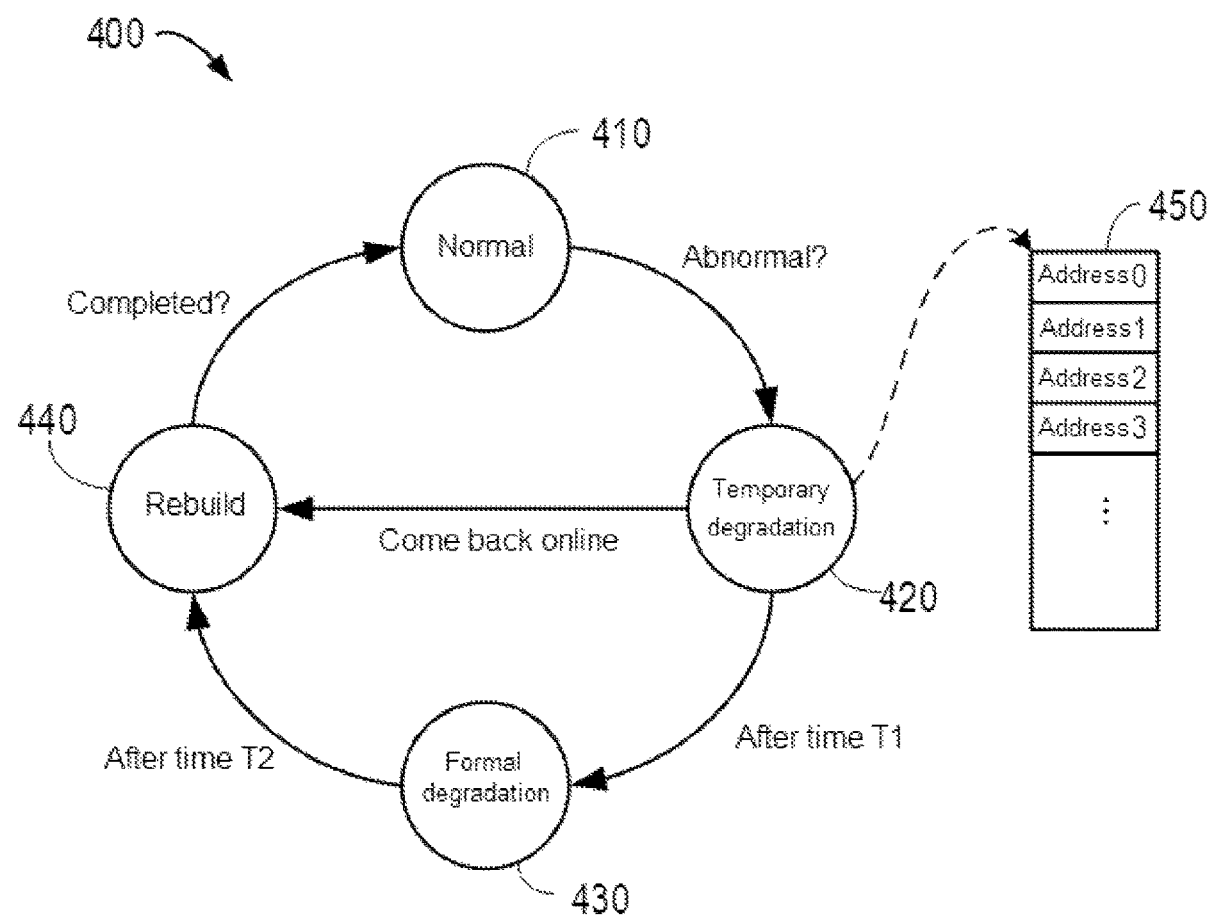
FIG. 4 shows a state diagram of a RAID according to the embodiments of the present disclosure.

FIG. 4 shows state diagram 400 of a RAID according to the embodiments of the present disclosure. It is assumed that the RAID is in normal state 410 at the beginning. For example, an I/O operation is performed on an example RAID 5 type as described in FIG. 1 to FIG. 2. In response to detecting an abnormality of a storage device in the RAID, the RAID will mark the storage device in its metadata and transition from normal state 410 to a degraded state to first enter temporary degraded state 420.

The RAID can enter formal degraded state 430 after it enters temporary degraded state 420 for a preset period of time T1 (for example, but not limited to, 30 seconds to 60 seconds). The RAID will enter rebuild state 440 if the abnormal storage device comes back online within the preset period of time T1 of temporary degraded state 420, or within standby time T2 (for example, but not limited to, 5 minutes to 10 minutes) of formal degraded state 430. Alternatively, if the RAID still fails to come back online after the standby period of time T2, the RAID may be switched to using a standby storage device or a standby disk to replace the abnormal storage device, and also enter rebuild state 440.

In addition, as shown in FIG. 4, in temporary degraded state 420, the address of the write operation for the RAID in the degraded state may be stored. For example, the address of the degraded write operation is stored in one storage area 450 in memory 120. Actions related to the states of the RAID are further described with reference to FIG. 5 to FIG. 8 after all the states and transitions of the RAID according to the embodiments of the present disclosure.

Figure 5:
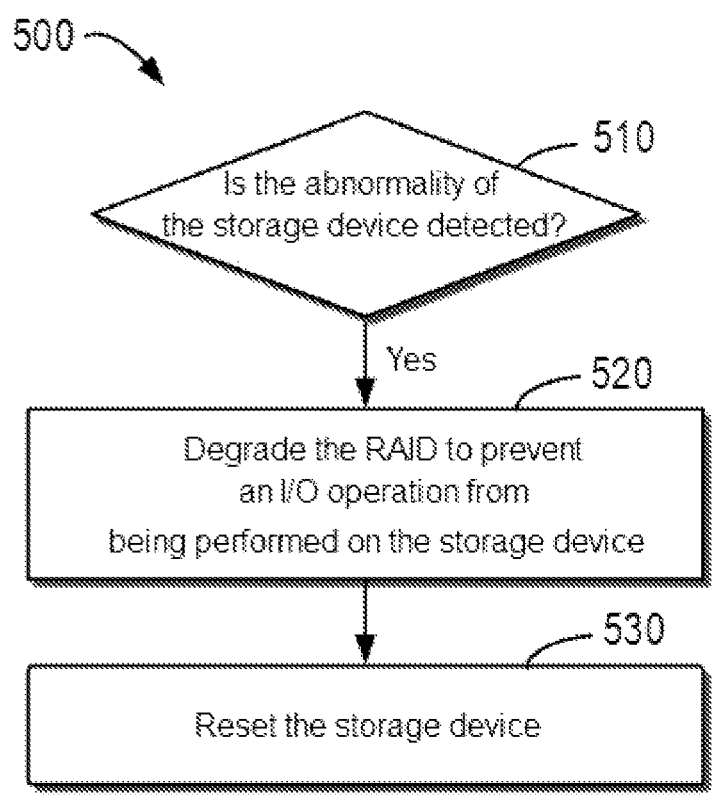
FIG. 5 shows a schematic flowchart of a method for processing an abnormality of a RAID according to the embodiments of the present disclosure.

FIG. 5 is a schematic flowchart of method 500 for processing an abnormality of a RAID according to the embodiments of the present disclosure. At block 510, whether an abnormality of a storage device is detected is determined. As described above, it is determined that the abnormality is detected based on one or more of the number of retryable errors generated by an I/O operation for the storage device, timeout errors generated by the storage device, and completion time of the I/O operation of the storage device.

At block 520, the RAID is degraded to prevent an I/O operation for the storage device. In some embodiments, the RAID first marks the abnormal storage device, and transitions from normal state 410 to temporary degraded state 420. In temporary degraded state 420, the I/O operations for the RAID are all marked as degraded I/O operations, so that storage devices with abnormalities or errors are not accessed. For example, no I/O operations for the storage devices are generated. However, in temporary degraded state 420, the I/O operations for the RAID can still continue.

In order to realize temporary degraded state 420, an indicator (for example, a bit) may be set in a memory (for example, memory 120) to indicate whether the RAID is in temporary degraded state 420. In temporary degraded state 420, the indicator is set (for example, set to 1) and, in the case of a distributed RAID, the indicator can be synchronized among a plurality of nodes in the RAID. As mentioned above, temporary degraded state 420 may last for a period of time T1 (for example, 30 seconds to 1 minute), and the indicator may be cleared (for example, set to 0) after T1. That is, it indicates that the RAID is no longer in temporary degraded state 420.

At block 530, the storage device is reset once it enters temporary degraded state 420. For example, RAID controller 130 may send a control code to a control platform of the storage device to reset the storage device. Resetting the storage device can be, for example, restarting the storage device, and this usually takes several seconds. After the reset, the storage device may be recovered from the abnormality and go online again, so the RAID may enter rebuild state 440, as shown in FIG. 4.

During this period, although the RAID is in temporary degraded state 420, the RAID can still receive I/O operations. For an I/O read operation, the RAID can read data from other storage devices without generating I/O of the storage device that is marked as abnormal. When the data of the marked storage device stores check data, complete data can be acquired directly from other devices; otherwise, the data of other storage devices can be used to calculate the data on the marked storage device through an encoding algorithm to acquire the complete data.

Traditionally, in order to maintain data consistency, the stripe of the write operation during degradation is marked as "degraded." For example, corresponding degradation information is set and indicated in the metadata. Then, a degraded stripe is determined by scanning all metadata of the RAID when the storage device or a replacing storage device comes back online to rebuild the RAID, thereby recovering the corresponding data blocks and achieving the consistency of data of the stripe. This approach has the problem that in case of extremely short degradation time (for example, when hiccup occurs), although there are a small number of write operations in the degraded state, all the stripes must be scanned for each rebuilding, which requires a lot of computing resources and time, leading to influence on the performance of the RAID. To this end, according to the embodiments of the present disclosure, addresses of the write operations during the temporary degradation are stored for direct use in the subsequent rebuilding phase.

As shown in FIG. 3, at block 330, an address of a write operation for the RAID within a preset period of time is stored, so as to rebuild the RAID in the case that the storage device is recovered within the preset period of time. Processing related to the write operation will be described in detail below with reference to FIG. 6.

Figure 6:
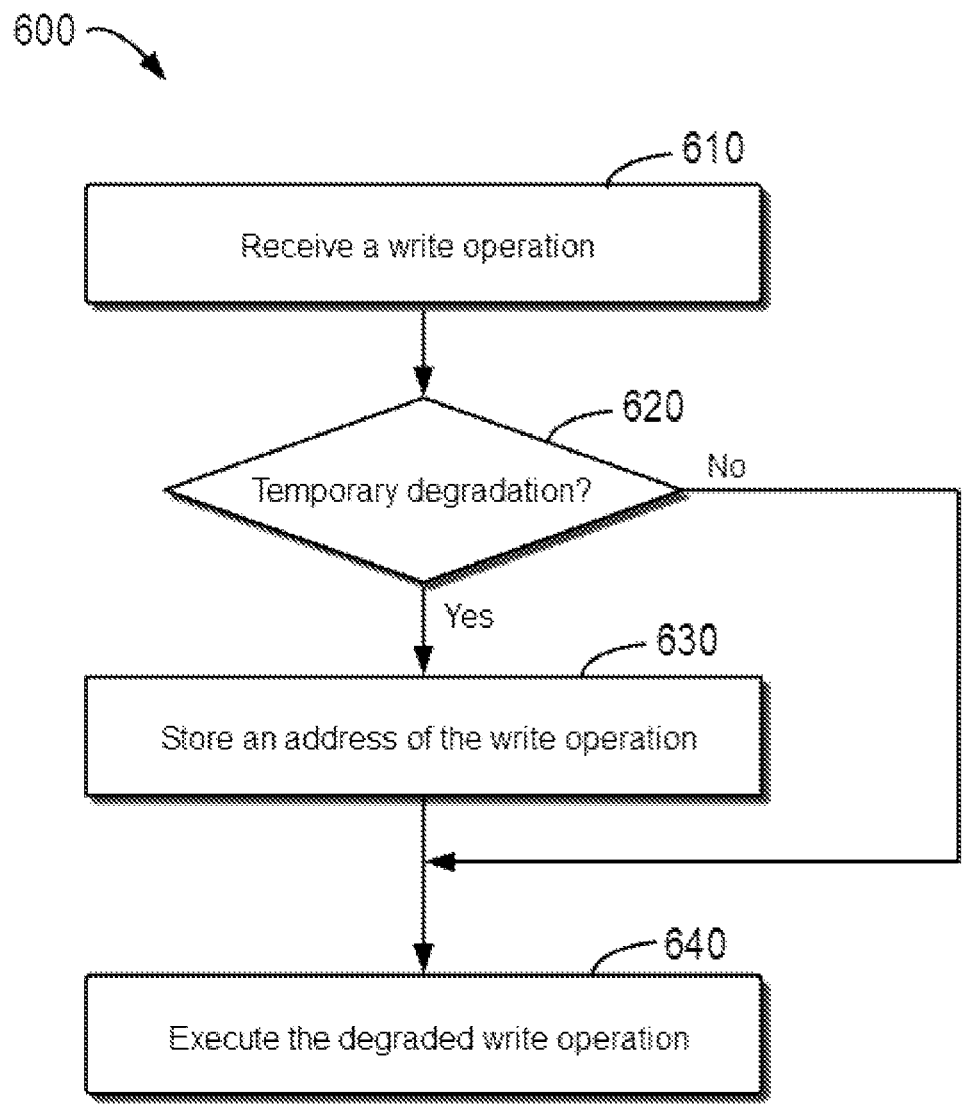
FIG. 6 shows a schematic flowchart of a method for processing a write operation for a RAID according to the embodiments of the present disclosure.

FIG. 6 shows a schematic flowchart of method 600 for processing a write operation for an RAID according to the embodiments of the present disclosure. At block 610, a write operation is received. In some embodiments, the RAID controller may receive the write operation for the RAID from processing unit 110, and the write operation may include a physical address of the RAID, such as a physical address of a stripe. As mentioned above, a physical storage space of the RAID is divided into a plurality of stripes (also known as physical large block (PLB)). Alternatively, the address in the write operation may also be a logical address, and the logical address may be mapped to the physical address of the RAID by the RAID controller.

At block 620, whether the RAID is in a temporary degraded state is determined. In some embodiments, whether the RAID is in temporary degraded state 420 can be determined by querying a set indicator. This indicator is set when the RAID transitions from a normal state to temporary degraded state 420. As described above, temporary degraded state 420 may last for a period of time T1 (for example, 30 seconds to 1 minute).

At block 630, the address of the write operation is stored if it is determined that the RAID is in temporary degraded state 420. In some embodiments, the address, such as the address of the stripe or PLB directed to by the write operation, of the write operation may be stored in a storage area of the memory. The size of the storage area may depend on the preset period of time T1 of the configured temporary degraded state. For example, for T1 of about 30 seconds to 1 minute, a storage area of about 2 to 4 MB can be set to store the address of the write operation. According to the embodiments of the present disclosure, when the storage device is recovered within a preset period of time, the stored address of the write operation will be used to rebuild the RAID.

At block 640, a degraded write operation is performed if it is determined that the RAID is not in temporary degraded state 420. At this time, no write operation is performed on the storage device with an abnormality or error, for example, no I/O operation for the storage device is generated.

After the period of time T1, temporary degradation 420 ends, and formal downgrade 430 starts. At this time, the indicator indicating the temporary degraded state in the memory can be cleared. For example, the indicator is set to 0. In some embodiments, the stored address can be cleared. That is, the stored address of the write operation is used to rebuild the RAID when the RAID transitions from temporary degraded state 420 to the rebuild state, but stripes to be rebuilt are determined by scanning the RAID when the RAID transitions from formal degraded state 430 to rebuild state 440.

It should be noted that since it is not known whether the abnormal storage device can quickly come back online after the resetting, stripes related to the write operation are all marked as degraded when the RAID is in the degraded state (regardless of temporary degradation or formal degradation). For example, the metadata of the stripe indicates that the stripe is degraded.

According to the embodiments of the present disclosure, the RAID can return from degraded states 420, 430 to normal state 410 by executing the rebuilding process of the RAID. Specifically, for consistency of the RAID, rebuilding is performed for the write operation in the degraded state, and the stored address of the write operation may be used to perform the rebuilding. The rebuilding process is described below with reference to FIG. 7.

Figure 7:
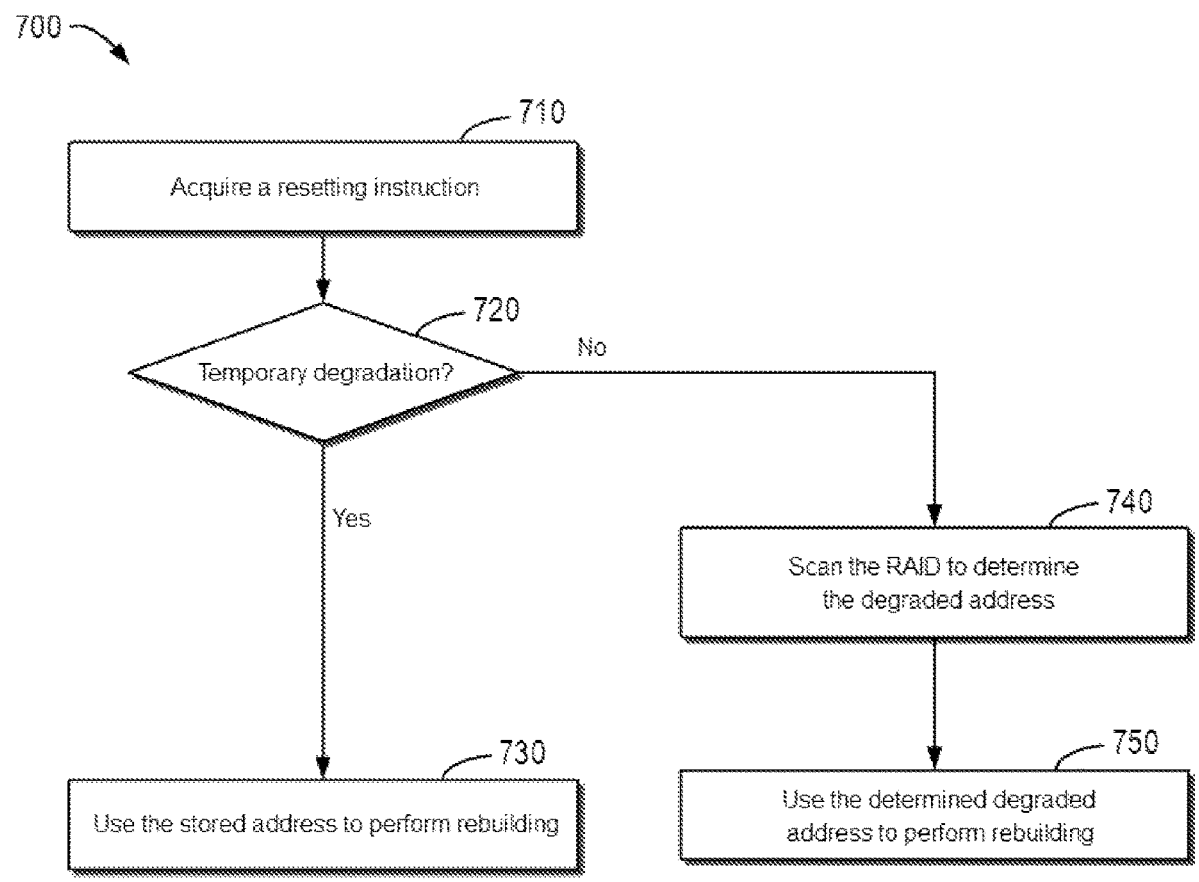
FIG. 7 shows a schematic flowchart of a method for rebuilding a RAID according to the embodiments of the present disclosure.

FIG. 7 shows a schematic flowchart of method 700 for rebuilding a RAID according to the embodiments of the present disclosure.

At block 710, a rebuilding instruction is acquired. In some embodiments, a storage device can be recovered within temporary degradation time by resetting, and send a ready signal to the RAID controller. Alternatively, the storage device may be recovered during the formal degradation after temporary degradation time T1, and may also send a ready signal to the RAID controller at this time. In addition, after entering the formal degraded state for formal degradation time T2, the storage device still fails to go online, and in case of using a standby storage device, a signal that the standby device is ready can also be sent to the RAID controller. In either case, the RAID controller acquires the rebuilding instruction to start the rebuilding process.

At block 720, whether the RAID is in a temporary degraded state is determined. Specifically, whether the RAID is in the temporary degraded state can be determined by querying an indicator in the memory. As mentioned above, within temporary degradation time T1, the identifier is set (for example, set to 1); and after time T1, the indicator is reset (for example, set to 0), that is, the temporary degraded state is off.

At block 730, the stored address is used to rebuild the RAID if the RAID is in the temporary degraded state. In some embodiments, the address of the write operation during the temporary degradation may be acquired in an iterative manner. For example, the smallest stripe address is acquired at first, and a corresponding stripe is rebuilt based on the stripe address; and a next stripe address is then acquired until all addresses have been rebuilt.

At block 740, the RAID is scanned to determine a degraded address if the RAID is not in the temporary degraded state. In some embodiments, a degraded stripe in the RAID can be determined by querying metadata of the RAID. This will take more time than simply using the stored address of the write operation.

At block 750, the determined degraded address is used to perform rebuilding. According to the embodiments of the present disclosure, the process of using the address in the memory for rebuilding and the process of using the address determined by scanning the RAID for rebuilding are similar. Specifically, an encoding algorithm is used to recover storage blocks of the storage device that goes online again through storage blocks of other storage devices on the stripe.

It can be seen that if the storage device comes back online from the temporary degraded state, the rebuilding is performed by only processing the stripe subjected to the degraded write operation, without accessing all the stripes, so that the RAID can be rebuilt faster.

The method for managing the RAID according to the embodiments of the present disclosure has been described above with reference to FIG. 3 to FIG. 7. Compared with the existing solution, this type of temporary errors of the RAID can be efficiently processed, the number of downtime of the RAID caused by the storage device or the back end can be reduced, and the computing resources and time required to rebuild the RAID can be significantly reduced.

Figure 8:
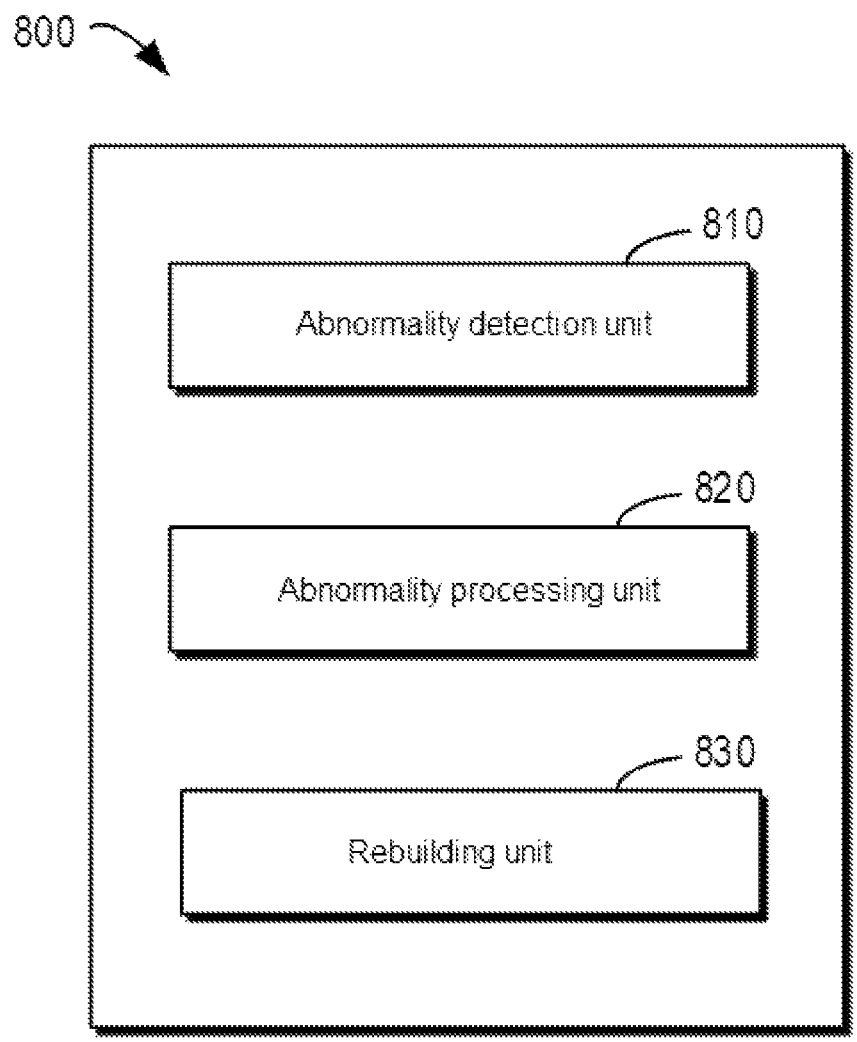
FIG. 8 is a schematic block diagram of an apparatus for managing a RAID according to the embodiments of the present disclosure.

FIG. 8 illustrates a schematic block diagram of apparatus 800 for managing a RAID according to the embodiments of the present disclosure. Apparatus 800 may be arranged at storage system 100, particularly implemented at RAID controller 130. Therefore, apparatus 800 is implemented, for example, by a computing device that implements storage system 100 or RAID controller 130.

As shown in the figure, apparatus 800 includes abnormality detection unit 810, abnormality processing unit 820, and rebuilding unit 830. Abnormality detection unit 810 is configured to detect an abnormality of a storage device in the RAID. In some embodiments, abnormality detection unit 810 may detect the abnormality based on the number of retryable errors generated by checking an I/O operation of the storage device. For example, the number of the retryable errors generated by the I/O operation reaches a threshold number, for example, 3 times, 5 times, or more. In some embodiments, the abnormality detection unit 810 may detect the abnormality based on a timeout error generated by the storage device. It should be understood that the timeout error explicitly indicates the abnormality of the storage device. In addition, abnormality detection unit 810 may also detect the abnormality based on completion time of the I/O operation for the RAID. The completion time of the I/O operation can be average completion time of I/O operations within the most recent period of time. For example, it is determined that the storage device is abnormal when the completion time of the storage device is greater than a certain threshold, or is significantly longer than that of other storage devices or historical completion time.

Abnormality processing unit 820 is configured to store an address of a write operation for the RAID in response to detecting the abnormality. In some embodiments, abnormality processing unit 820 may be configured to reset the storage device in response to detecting the abnormality. For example, abnormality processing unit 820 may send a control code to a control platform to restart the storage device.

Abnormality processing unit 820 is further configured to store the address of the write operation for the RAID within a preset period of time, so as to rebuild the RAID in the case that the storage device is recovered within the preset period of time. In some embodiments, the preset period of time is a duration of the aforementioned temporary degraded state. The stored address of the write operation can be used to rebuild the RAID when the storage device is recovered in the temporary degraded state by resetting. The address of the write operation can be, for example, a physical address of a stripe or a PLB of the RAID, or a logical address that can be mapped to a physical address.

In addition, abnormality processing unit 820 may also be configured to degrade the RAID to prevent an I/O operation from being performed on the storage device. According to the embodiments of the present disclosure, the RAID first transitions to the temporary degraded state. Specifically, for example, abnormality processing unit 820 can set an indicator. The indicator is set to 1 when the RAID enters the temporary degraded state; and the indicator is set to 0 when the RAID leaves the temporary degraded state and enters the formal degraded state.

In some embodiments, abnormality processing unit 820 may also be configured to mark the address of the write operation for the degraded (regardless of temporary degradation or formal degradation) RAID as degraded. For example, metadata of the address can be updated to indicate that the address is degraded.

Rebuilding unit 830 may be configured to rebuild the RAID based on the stored address in the case that the storage device is recovered from the abnormality. In some embodiments, rebuilding unit 830 rebuilds the RAID based on the stored address in the case that the storage device is recovered within a preset period of time T1 (for example, about 30 seconds to 1 minute), for example, when the RAID is still in the temporary degraded state. Alternatively, in the case that the storage device is not recovered after preset time T1, for example, the storage device is recovered within the formal degradation period after the temporary degradation has ended, or is not recovered even after it enters the formal degradation for a period of time T2 (for example, about 5 to 10 minutes), rebuilding unit 830 rebuilds the RAID based on the degraded address of the RAID.

Similarly, compared with the existing solution, apparatus 800 of the present disclosure can efficiently process this type of temporary errors of the RAID, reduce the number of downtime of the RAID caused by the storage device or the back end, and significantly reduce the computing resources and time required to rebuild the RAID.

Figure 9:
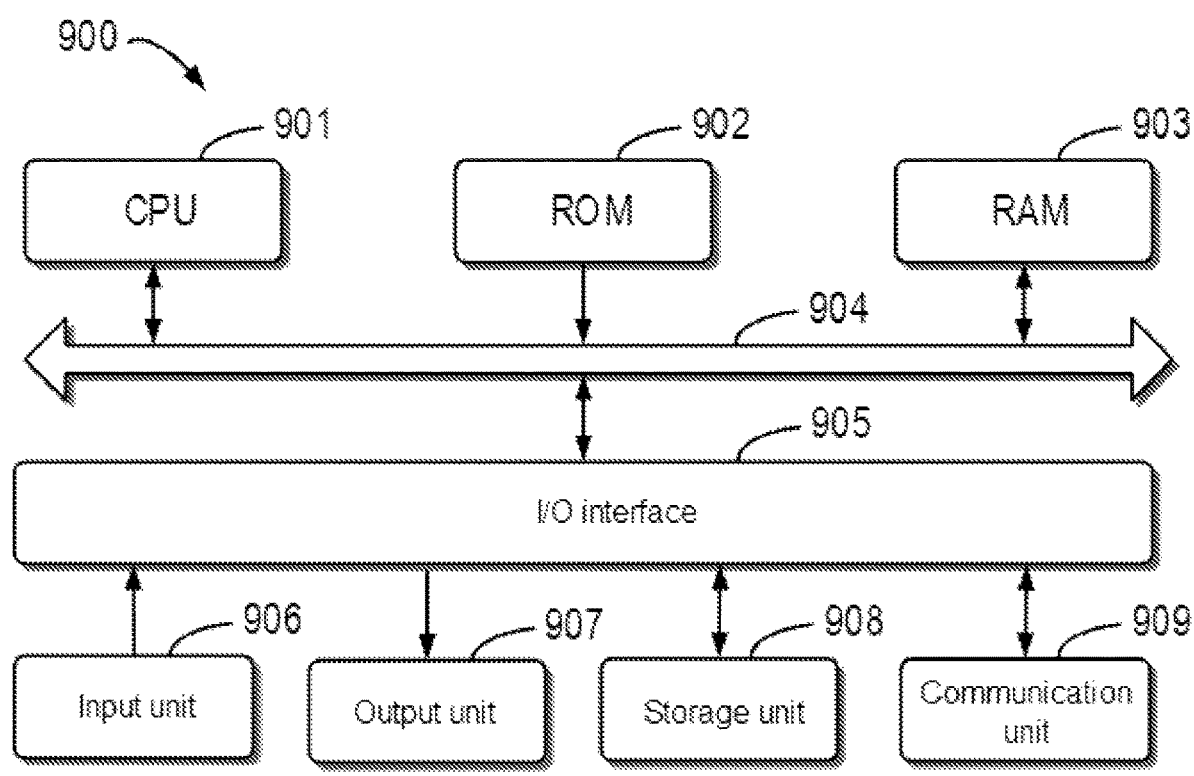
FIG. 9 shows a schematic block diagram of an example device that can be configured to implement the embodiments of the present disclosure.

FIG. 9 shows a schematic block diagram of example device 900 that may be configured to implement the embodiments of the present disclosure. For example, a backup system and/or a recovery system according to the embodiments of the present disclosure may be implemented by device 900. As shown in the figure, device 900 includes central processing unit (CPU) 901 that may perform various appropriate actions and processing according to computer program instructions stored in read-only memory (ROM) 902 or computer program instructions loaded from storage unit 908 into random access memory (RAM) 903. In RAM 903, various programs and data required for the operation of device 900 may also be stored. CPU 901, ROM 902, and RAM 903 are connected to one another through bus 904. Input/output (I/O) interface 905 is also connected to bus 904.

Multiple components in device 900 are connected to I/O interface 905, including: input unit 906, such as a keyboard and a mouse; output unit 907, such as various types of displays and speakers; storage unit 908, such as a magnetic disk and an optical disk; and communication unit 909, such as a network card, a modem, and a wireless communication transceiver. Communication unit 909 allows device 900 to exchange information/data with other devices through a computer network such as the Internet and/or various telecommunication networks.

The various processes and processing described above, for example, method 200 and/or method 700, may be performed by processing unit 901. For example, in some embodiments, method 200 and/or method 700 may be implemented as a computer software program that is tangibly included in a machine-readable medium such as storage unit 908. In some embodiments, part or all of the computer program may be loaded and/or installed onto device 900 via ROM 902 and/or communication unit 909. When the computer program is loaded onto RAM 903 and executed by CPU 901, one or more actions of method 200 and/or method 700 described above may be executed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device capable of retaining and storing instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, state setting data, or source code or object code written in any combination of one or more programming languages, the programming languages including object oriented programming languages, such as Smalltalk, C++, and the like, and conventional procedural programming languages, such as the "C" language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer may be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), may be customized by utilizing status information of the computer-readable program instructions. The electronic circuit may execute the computer-readable program instructions to implement various aspects of the present disclosure.

Various aspects of the present disclosure are described here with reference to flowcharts and/or block diagrams of the method, the apparatus (system), and the computer program product implemented according to the embodiments of the present disclosure. It should be understood that each block of the flowcharts and/or block diagrams and combinations of blocks in the flowcharts and/or block diagrams may be implemented by computer-readable program instructions.

These computer-readable program instructions may be provided to a processing unit of a general-purpose computer, a special-purpose computer, or another programmable data processing apparatus, thereby producing a machine, such that these instructions, when executed by the processing unit of the computer or another programmable data processing apparatus, produce means (e.g., specialize circuitry) for implementing functions/actions specified in one or more blocks in the flowcharts and/or block diagrams. These computer-readable program instructions may also be stored in a computer-readable storage medium, and these instructions cause a computer, a programmable data processing apparatus, and/or another device to operate in a specific manner; and thus the computer-readable medium having instructions stored includes an article of manufacture that includes instructions that implement various aspects of the functions/actions specified in one or more blocks in the flowcharts and/or block diagrams.

The computer-readable program instructions may also be loaded to a computer, another programmable data processing apparatus, or another device, so that a series of operating steps may be performed on the computer, another programmable data processing apparatus, or another device to produce a computer-implemented process, such that the instructions executed on the computer, another programmable data processing apparatus, or another device may implement the functions/actions specified in one or more blocks in the flowcharts and/or block diagrams.

The flowcharts and block diagrams in the drawings illustrate the architectures, functions, and operations of possible implementations of the systems, methods, and computer program products according to various embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flowcharts as well as a combination of blocks in the block diagrams and/or flowcharts may be implemented using a dedicated hardware-based system that executes specified functions or actions, or using a combination of special hardware and computer instructions.

Various implementations of the present disclosure have been described above. The foregoing description is illustrative rather than exhaustive, and is not limited to the disclosed implementations. Numerous modifications and alterations are apparent to persons of ordinary skill in the art without departing from the scope and spirit of the illustrated implementations. The selection of terms used herein is intended to best explain the principles and practical applications of the implementations or the improvements to technologies on the market, or to enable other persons of ordinary skill in the art to understand the implementations disclosed herein.

The invention claimed is:

1. A method for managing a redundant array of independent disks (RAID), comprising:
   detecting an abnormality of a storage device in the RAID;
   setting, in response to detecting the abnormality, a RAID stripe in the RAID to a degraded state, the RAID stripe including a storage location of the storage device;
   resetting the storage device in response to detecting the abnormality; and
   in response to setting the RAID stripe to the degraded state, storing an address of a write operation for the RAID within a preset time period, so as to rebuild the RAID in the case that the storage device is recovered within the preset time period.

2. The method according to claim 1, wherein detecting the abnormality of the storage device in the RAID comprises detecting at least one of the following items:
   the number of retryable errors generated by an input/output (I/O) operation for the storage device, a timeout error generated by the storage device, and completion time of the I/O operation for the storage device.

3. The method according to claim 1, further comprising: clearing away the stored address after the preset time period.

4. The method according to claim 1, further comprising: in response to detecting the abnormality, degrading the RAID to prevent an I/O operation for the storage device.

5. The method according to claim 4, further comprising: marking the address of the write operation for the degraded RAID as degraded, to rebuild the RAID in the case that the storage device is not recovered within the preset time.

6. The method according to claim 1, further comprising: receiving an indication that the storage device was recovered within the preset time period; and
rebuilding, by retrieving the stored address and in response to receiving the indication, data of the RAID stripe.

7. The method according to claim 6, further comprising: performing, in response to detecting the abnormality, the write operation as a degraded write operation to the RAID stripe, the degraded write operation storing data in at least one non-degraded storage location of the RAID stripe; and
wherein rebuilding data of the RAID stripe includes:
retrieving, based on the stored address, data in the at least one non-degraded storage location of the RAID stripe; and
constructing, based on the data in the at least one non-degraded storage location, data of the storage device.

8. An apparatus for managing a redundant array of independent disks (RAID), comprising:
an abnormality detection unit, configured to detect an abnormality of a storage device in the RAID; and
an abnormality processing unit, configured to set, in response to detecting the abnormality, a RAID stripe in the RAID to a degraded state, the RAID stripe including a storage location of the storage device;
wherein the abnormality processing unit is further configured to reset the storage device in response to detecting the abnormality;
wherein the abnormality processing unit is further configured to, in response to setting the RAID stripe to the degraded state, store an address of a write operation for the RAID within a preset time period, so as to rebuild the RAID in the case that the storage device is recovered within the preset time period.

9. The apparatus according to claim 8, wherein the abnormality detection unit is further configured to detect at least one of the following items:
the number of retryable errors generated by an input/output (I/O) operation for the storage device,
a timeout error generated by the storage device, and completion time of the I/O operation for the storage device.

10. The apparatus according to claim 8, wherein the abnormality processing unit is further configured to clear away the stored address after the preset time period.

11. The apparatus according to claim 8, wherein the abnormality processing unit is further configured to degrade the RAID, in response to detecting the abnormality, to prevent an I/O operation for the storage device.

12. The apparatus according to claim 11, wherein the abnormality processing unit is further configured to:

mark the address of the write operation for the degraded RAID as degraded, so as to rebuild the RAID in the case that the storage device is not recovered within the preset time.

13. The apparatus according to claim 8, wherein the abnormality processing unit is further configured to:
receive an indication that the storage device was recovered within the preset time period; and
rebuild, by retrieving the stored address and in response to receiving the indication, data of the RAID stripe.

14. The apparatus according to claim 13, wherein the abnormality processing unit is further configured to:
perform, in response to detecting the abnormality, the write operation as a degraded write operation to the RAID stripe, the degraded write operation storing data in at least one non-degraded storage location of the RAID stripe; and
wherein rebuilding data of the RAID stripe includes:
retrieving, based on the stored address, data in the at least one non-degraded storage location of the RAID stripe; and
constructing, based on the data in the at least one non-degraded storage location, data of the storage device.

15. An electronic device, comprising:
at least one processing unit; and
at least one memory, coupled to the at least one processing unit and storing instructions for execution by the at least one processing unit, wherein the instructions, when executed by the at least one processing unit, cause the electronic device to perform a method of managing a redundant array of independent disks (RAID) which includes,
detecting an abnormality of a storage device in the RAID;
setting, in response to detecting the abnormality, a RAID stripe in the RAID to a degraded state, the RAID stripe including a storage location of the storage device;
resetting the storage device in response to detecting the abnormality; and
in response to setting the RAID stripe to the degraded state, storing an address of a write operation for the RAID within a preset time period, so as to rebuild the RAID in the case that the storage device is recovered within the preset time period.

16. The electronic device according to claim 15, wherein the method further comprises:
receiving an indication that the storage device was recovered within the preset time period; and
rebuilding, by retrieving the stored address and in response to receiving the indication, data of the RAID stripe.

17. The electronic device according to claim 16, wherein the method further comprises:
performing, in response to detecting the abnormality, the write operation as a degraded write operation to the RAID stripe, the degraded write operation storing data in at least one non-degraded storage location of the RAID stripe; and
wherein rebuilding data of the RAID stripe includes:
retrieving, based on the stored address, data in the at least one non-degraded storage location of the RAID stripe; and
constructing, based on the data in the at least one non-degraded storage location, data of the storage device.

18. A computer program product having a non-transitory computer readable medium which stores a set of instructions to manage a redundant array of independent disks (RAID); the set of instructions, when carried out by computerized circuitry, causing the computerized circuitry to perform a method of:

detecting an abnormality of a storage device in the RAID;

setting, in response to detecting the abnormality, a RAID stripe in the RAID to a degraded state, the RAID stripe including a storage location of the storage device;

resetting the storage device in response to detecting the abnormality; and in response to setting the RAID stripe to the degraded state, storing an address of a write operation for the RAID within a preset time period, so as to rebuild the RAID in the case that the storage device is recovered within the preset time period.

19. The computer program product according to claim 18, wherein the method further comprises:

receiving an indication that the storage device was recovered within the preset time period; and rebuilding, by retrieving the stored address and in response to receiving the indication, data of the RAID stripe.

20. The computer program product according to claim 19, wherein the method further comprises:

performing, in response to detecting the abnormality, the write operation as a degraded write operation to the RAID stripe, the degraded write operation storing data in at least one non-degraded storage location of the RAID stripe; and wherein rebuilding data of the RAID stripe includes:

retrieving, based on the stored address, data in the at least one non-degraded storage location of the RAID stripe; and constructing, based on the data in the at least one non-degraded storage location, data of the storage device.

\* \* \* \* \*